United States Patent [19]
Kageyama

[11] Patent Number: 6,127,964
[45] Date of Patent: Oct. 3, 2000

[54] MONITORING MECHANISM OF OBSTACLE DETECTING APPARATUS FOR VEHICLE

[75] Inventor: Masato Kageyama, Oyama, Japan

[73] Assignee: Komatsu Ltd., Tokyo, Japan

[21] Appl. No.: 09/270,934

[22] Filed: Mar. 16, 1999

[30] Foreign Application Priority Data

Mar. 17, 1998 [JP] Japan .................................. 10-085134

[51] Int. Cl.[7] .................................................. G01S 13/93
[52] U.S. Cl. .............................. 342/70; 342/71; 340/903
[58] Field of Search .................................. 342/70, 71, 72; 701/300, 301; 702/94, 95, 143; 340/903, 933, 934, 935

[56] References Cited

FOREIGN PATENT DOCUMENTS 57-42866    3/1982    Japan .
5-157850    6/1993    Japan .
6-88870     3/1994    Japan .

*Primary Examiner*—John B. Sotomayor
*Attorney, Agent, or Firm*—Sidley & Austin

[57] ABSTRACT

A monitoring mechanism of an obstacle detecting apparatus for a vehicle can be applied to various kinds of obstacle detecting apparatuses and is preferable for judging whether good or bad. Accordingly, the obstacle detecting apparatus for a vehicle having an outgoing device (51) for outgoing a medium (Lo) to a traveling direction of a vehicle (B), an incoming device (52) for incoming a reflected medium (Li) from an obstacle (D) and a calculating device (53) for defining an existence of the obstacle (D) on the basis of a difference between the outgoing and incoming mediums (Lo, Li) is provided with a monitoring mechanism (6) comprising a rotating device (61) integrally supporting the outgoing and incoming devices (51, 52) in a freely rotatable manner, a reflecting device (62) reflecting the outgoing medium (Lo) to the incoming device when a rotating angle ($\theta$) of the rotating device is within a predetermined angle range ($\theta 1$ to $\theta 2$), a rotating angle detecting device (63) of the rotating device, and a judging device (65) comparing at least one of the incoming medium (Li) and a distances (E) calculated by the calculating device (53) with standards (L1 to L2, E1 to E2) corresponding to the at least one when the rotating angle ($\theta$) from the rotating angle detecting device is within a predetermined angle range ($\theta 1$ to $\theta 2$) and further judging an abnormality in the obstacle detecting apparatus.

13 Claims, 6 Drawing Sheets

MONITORING FLOW CHART IN ACCORDANCE WITH EMBODIMENT

MONITORING FLOW CHART IN ACCORDANCE WITH ANOTHER EMBODIMENT

STANDARD PATTERN VIEW

STANDARD PATTERN VIEW

MONITORING MECHANISM OF OBSTACLE DETECTING APPARATUS FOR VEHICLE

FIELD OF THE INVENTION

The present invention relates to a monitoring mechanism of an obstacle detecting apparatus for a vehicle provided with a monitoring mechanism for judging whether the obstacle detecting apparatus is good or bad.

BACKGROUND OF THE INVENTION

In recent days, there is a structure which has an obstacle detecting apparatus and an alarm in a vehicle traveling on a highway or the like, detects an obstacle existing on a traveling road by an obstacle detecting apparatus and informs an operator of an existence of the obstacle by the alarm. Further, in an unmanned dump truck which travels on a fixed course in a mine or the like, it is structured such as to detect the obstacle existing on the course by the obstacle detecting apparatus and automatically control the vehicle by a brake.

The obstacle detecting apparatus is roughly classified into a transmitting and receiving type and a receiving type, and both commonly have an ultrasonic type, an optical type, an electric wave type and the like. In this case, an ultrasonic type and an infrared light type are preferable for detecting a short distance (shorter than about 15 m), a laser light type is used for detecting both of a short distance and a long distance, and a millimeter wave is preferable for detecting a medium distance (about 120 to 150 m at the shortest). The details are as follows.

The transmitting and receiving type has an outgoing device for outgoing a medium such as a sound, a light, an electric wave and the like in a traveling direction of a vehicle, an incoming device for incoming a medium reflected by an obstacle existing in an outgoing direction of the medium, and a calculating device which receives the outgoing medium from the outgoing device and the incoming medium in the incoming device and calculates a distance from the vehicle to the obstacle on the basis of a difference between them so as to define an existence of the obstacle on the basis of the distance. In this case, the "difference between them" means a time difference between an outgoing time of the outgoing medium and an incoming time of the incoming medium, and in the case of the millimeter wave or the like, in the calculating device which employs a frequency analyzing process such as an FM-CW or the like, it means a strength difference, a phase difference or the like of the incoming millimeter wave.

The receiving type is structured such that the outgoing device is omitted in the transmitting and receiving type mentioned above, and corresponds to a receiving side in a so-called beacon, however, in a structure for a vehicle, since the transmitting device can not be provided in all of many and unspecified obstacles (stones, rocks, cliffs, animals and the like) existing on a traveling road, in most cases, an image processing type is employed.

In this case, the obstacle detecting apparatus is connected to an alarm and a brake so as to constitute a safety mechanism, however, when a trouble is generated in the obstacle detecting apparatus itself, a requirement for a safety can not be satisfied. Then, for example, the following monitoring mechanism for the obstacle detecting apparatus is disclosed.

(1) Japanese Patent Unexamined Publication No. 6-88870 discloses a technique which monitors a gate current of a transistor installed in an obstacle detecting apparatus and judges "an abnormality" when the gate current is out of a standard.

(2) Japanese Patent Unexamined Publication Nos. 57-42866 and 5-157850 disclose a technique which pays attention to a fine reflected sound inherently unnecessary and yet detected out of a course generated due to a non-directivity of a radiant sound, in the ultrasonic type and judges "an abnormality" when not detecting it.

However, the prior art mentioned above has the following problems.

(1) In Japanese Patent Unexamined Publication No. 6-88870, it is definitely judged that "an abnormality of the transistor is an abnormality of the obstacle detecting apparatus", however, there is a problem that it is not definitely judged that "an abnormality of the obstacle detecting apparatus is an abnormality of the transistor". For example, when a dust and a mud are attached to a surface of the outgoing device and the incoming device, a strength of the outgoing medium and the incoming medium is reduced, so that at this time, it should be judged that "the obstacle detecting apparatus is abnormal", however, it can not be always said at this time that "the gate current of the transistor is out of the standard".

(2) Japanese Patent Unexamined Publication Nos. 57-42866 and 5-157850 relates to a monitoring technology with respect to the ultrasonic type having a non-directivity, however, it is hard to apply the monitoring technology to a laser beam having a strong directivity, a millimeter wave which can freely set a directivity and the like. Further, since the laser beam and the millimeter wave are structured such that a detecting accuracy is largely changed in accordance with a dust in an air, a size and a shape of the reflected object, a ground clutter and the like, it is hard to detect a fine reflected medium and to set a judging standard with respect thereto.

SUMMARY OF THE INVENTION

The present invention is made by taking the problems in the prior art mentioned above into consideration, and an object of the present invention is to provide a monitoring mechanism of an obstacle detecting apparatus for a vehicle which can be applied to various kinds of obstacle detecting apparatus for the vehicle and is preferable for judging whether the obstacle detecting apparatus is good or bad.

In accordance with a first aspect of the present invention, there is provided a monitoring mechanism of an obstacle detecting apparatus for a vehicle having an outgoing device for outgoing a medium (i.e., a transmitter or transmitting a signal) Lo such as a sound, a light, an electric wave and the like to a traveling direction of a vehicle, an incoming device for incoming a medium (i.e., a receiver for receiving a signal) Li reflected by an obstacle existing in an outgoing direction of the medium Lo, a calculating device which receives the outgoing medium Lo from the outgoing device and the incoming medium Li in the incoming device and calculates a distance from the vehicle to the obstacle on the basis of a difference between them so as to define an existence of the obstacle on the basis of the distance, and being mounted on the vehicle, wherein the obstacle detecting apparatus is provided with a monitoring mechanism, said monitoring mechanism comprising a rotating device integrally supporting the outgoing device and the incoming device in a freely rotatable manner, a predetermined reflecting device reflecting the outgoing medium Lo from the outgoing device toward the incoming device when the rotating device rotates and a rotating angle θ becomes a predetermined angle range θ1 to θ2, a rotating angle detecting device detecting the rotating angle θ of the rotating device, and a judging device connected to at least one of the incoming device and the calculating device and the rotating angle detecting device, comparing at least one of the incoming medium Li from the incoming device and a distances calculated by the calculating device with standards L1 to L2, E1 to E2 previously stored in correspondence to the at least one when the rotating angle θ from the rotating angle detecting device is within a predetermined angle range θ1 to θ2, and judging on the basis of the comparison whether or not an abnormality exists in at least one of the obstacle detecting apparatus, the rotating device, the predetermined reflecting device and the rotating angle detecting device, and being mounted on the vehicle.

The predetermined reflecting device is arranged at a position at which the outgoing medium Lo from the outgoing device is reflected toward the incoming device when the rotating device rotates and the rotating angle θ becomes a predetermined angle range θ1 to θ2 (a position on the vehicle). That is, it is possible to monitor the obstacle detecting apparatus by the monitoring mechanism when "θ=θ1 to θ2" is established, and it is possible to perform a normal obstacle detection when "θ≠θ1 to θ2" is established. Accordingly, when monitoring by the monitoring mechanism, the rotating device is directed to the predetermined reflecting device (θ=θ1 to θ2), and an existence of the predetermined reflecting device is recognized by the obstacle detecting apparatus. Since the rotating device and the predetermined reflecting device are both provided on the vehicle, the separated distance between the both is constant, so that various kinds of universal standards can be set. As a result, if there is a change when comparing a result detecting the predetermined reflecting device with the standard, it can be of course judged that an abnormality exists in at least one of the obstacle detecting apparatus, the rotating device, the predetermined reflecting device and the rotating angle detecting device. The first aspect is structured on the basis of the effects mentioned above. That is, in accordance with the first aspect, the following effects can be obtained.

(1) Since the outgoing device and the incoming device are integrally provided on the rotating device in a freely rotatable manner, rays of the both are not changed. Accordingly, it is possible to accurately detect the obstacle and the predetermined reflecting device.

(2) In the obstacle detecting apparatus using the medium which can narrow an angle of a ray (a laser beam and a millimeter wave, there is an advantage that it is hard to detect an unnecessary obstacle disposed out of the course, however, on the contrary, there is a disadvantage that it is hard to detect the obstacle existing in front of the curve because the angle of the ray is narrow. However, the medium is structured such as to be capable of performing a scanning and outgoing by the rotating device. Accordingly, it is possible to easily detect the obstacle existing in front of the curve.

(3) Further, the monitoring by the monitoring mechanism is performed when the rotating angle θ of the rotating device is within the predetermined angle range θ1 to θ2. Then, the predetermined angle range θ1 to θ2 can be of course out of the scanning angle mentioned above. That is, the monitoring mechanism does not relate to the normal detection of the obstacle at all.

(4) Further, the monitoring by the monitoring mechanism is performed by a combination of the rotating angle θ and at least one of whether or not the incoming medium Li exists, the strength of the incoming medium Li and the distance to the predetermined reflecting device, so that the freedom of the combination is significantly high. In other words, a freedom of setting a comparative standard with respect to an information becomes significantly high. Accordingly, it is possible to set the standards L1 to L2 and/or E1 to E2 which can easily specify any one of the obstacle detecting apparatus, the rotating device, the predetermined reflecting device and the rotating angle detecting device causing the abnormality.

(5) In the item (2) mentioned above, an explanation was given of the effect of the medium which can narrow the angle of the ray, however, the monitoring mechanism can be applied to a medium having a wide ray (an ultrasonic wave and an infrared ray) and a medium having a short detecting distance (an ultrasonic wave and an infrared ray). That is, the monitoring mechanism can be applied to various kinds of obstacle detecting apparatus for the vehicle and can judge whether good or bad in a significantly effective manner.

(6) Here, the first aspect will be supplemented.

In a normal detection of the obstacle, the rotating device may be structured such as not to be rotated, to be always rotated (particularly, in the case of using the medium having a narrowed angle of the ray in a large-sized vehicle or the like), or to be rotated as occasion demands (the case of the curve mentioned above or the like).

Further, it is desirable that the judging device can accurately recognize the rotating angle θ of the rotating device. Accordingly, in the first aspect mentioned above, there is provided the rotating angle detecting device for detecting the rotating angle θ of the rotating device, however, in a step motor, a driving pulse signal itself corresponds to the rotating angle θ. Therefore, in this case, the rotating angle detecting device and a driving pulse signal oscillator have the same meaning.

Further, the calculating device and the judging device are described as mutually independent components, however, one component obtained by combining the judging device and the calculating device has the same meaning, and the structure mentioned above is included in the first aspect. The description is not given of a driving of the rotating device. This is because there is no difference in an operation and an effect of monitoring on the basis of the monitoring mechanism in the case of either an automatic drive or a manual drive.

In accordance with a second aspect, there is provided a monitoring mechanism of an obstacle detecting apparatus for a vehicle as cited in the first aspect, wherein the monitoring mechanism has a vehicle stop detecting device which detects a stop time of the vehicle so as to input a vehicle stop signal St to the judging device, the rotating device receives drive signals θa and θb from the judging device so as to be freely rotatable, and the judging device is connected to the vehicle stop detecting device and gives the drive signal θb to the rotating device when receiving the vehicle stop signal St from the vehicle stop detecting device so as to rotate the rotating device at a predetermined angle range θ1 to θ2.

In accordance with the second aspect, the following operation and effect can be obtained. When the monitoring mechanism serves a monitoring function during a travel of the vehicle, a monitoring accuracy is affected by an oscillation of a vehicle body and the like. Further, first of all, the obstacle detecting device should be intent on searching the obstacle. Then, in the second aspect, the monitoring mechanism serves a monitoring function when the vehicle stop signal St is received from the vehicle stop detecting device. Accordingly, since the monitoring is not performed during the travel, it is possible to prevent the monitoring accuracy from changing due to the oscillation of the vehicle, and first of all, the obstacle detecting apparatus can be intent on searching the obstacle during the travel. In this case, the "stop time of the vehicle" detected by the vehicle stop detecting device can be exemplified by a neutral time of a transmission, an effective time of a parking brake, a stop time of an engine, a measured vehicle speed 0 time in the case of the vehicle having a vehicle speed meter, and the like.

In accordance with a third aspect, there is provided a monitoring mechanism of an obstacle detecting apparatus for a vehicle as cited in the first or second aspect, wherein the rotating device rotates the rotating angle θ at a predetermined angle range θ1 to θ2 at a predetermined time t.

In accordance with the third aspect, the following operation and effect can be obtained. Since the predetermined time t is set, the monitoring mechanism may be operated at a time of traveling as well as when the vehicle is at a certain time during the stop time or at every vehicle stop times. However, as mentioned above, it is preferable to be intent on detecting the obstacle during the travel. However, in many cases, the time for operating the monitoring mechanism can be achieved by about one some second. For example, immediately after entering to the straight course and not detecting the obstacle (corresponding to a first example of the predetermined time t), there is no problem at all if the monitoring mechanism is operated. Further, when the rotating device rotates, thereby changing an outgoing direction, or when the outgoing direction is directed to a direction unnecessary for monitoring the obstacle during the change (corresponding to a second example of the predetermined time t), it is possible to set such that the outgoing direction becomes the predetermined angle range θ1 to θ2 so as to operate the monitoring mechanism at this time. Further, when entering to a course such as a crossing and the like where a speed reduction and a stop should be apparently performed (corresponding to a third example of the predetermined time t), or in the case of a vehicle apparently traveling at a low speed, for example, a wheel loader (normally having a maximum speed of about 35 km/h), it is apparent that the monitoring mechanism may be operated, for example, at every three hours (corresponding to a fourth example of the predetermined time t). Further, in a manned vehicle, it is apparent that the monitoring mechanism may be operated at any time during the travel (corresponding to a fifth example of the predetermined time t). That is, a freedom of the monitoring mechanism at the operating time is increased.

In accordance with a fourth aspect, there is provided a monitoring mechanism of an obstacle detecting apparatus for a vehicle as cited in the first, second or third aspect, wherein a plurality of predetermined reflecting devices are arranged in medium path Lo–Li from the outgoing device to the incoming device.

In accordance with the fourth aspect, the following operation and effect can be obtained. In the first to third aspects mentioned above, no attention is paid to a number of the arranged predetermined reflecting devices. However, in accordance with the fourth aspect, the medium path Lo Li from the outgoing device to the incoming device becomes long, and a distance search error when operating the monitoring mechanism is cancelled at a lengthened degree, so that an accurate monitoring can be performed. Further, it is a specified example, however, in a structure of detecting the obstacle by frequency diffracting the millimeter wave by an FM-CW (FFT), a DC component (a direct current component) appears when the distance is near 0, so that the predetermined reflecting device can not be detected. For example, in the obstacle detecting apparatus having a resolving power of 2 m, the medium path Lo–Li can not detect the obstacle having a size of about 3 m or less and the predetermined reflecting device. Even in this case, it is possible to lengthen the medium path Lo–Li so as to detect.

In accordance with a fifth aspect, there is provided a monitoring mechanism of an obstacle detecting apparatus for a vehicle as cited in the first, second, third or fourth aspect, wherein there is provided a plurality of rotating devices integrally supporting the predetermined reflecting device in addition to the outgoing device and the incoming device in a freely rotatable manner, and the respective predetermined reflecting devices are supported to the respective rotating devices so that the predetermined reflecting device of one of the reflecting devices reflects the outgoing medium Lo from the other outgoing device and incomes it to the other incoming device between at least two rotating devices and when simultaneously rotating the rotating devices at a predetermined angle range θ1 to θ2.

In accordance with the fifth aspect, the following operation and effect can be obtained. In the first to fourth aspects mentioned above, no attention is paid to a number of the arranged rotating devices. However, in accordance with the fifth aspect, the following advantage can be obtained.

(1) Since there are provided a plurality of rotating devices, it is possible to preferably use in a vehicle having a great vehicle width and a great vehicle length such as a large-sized vehicle for a mine and the like.

(2) The outgoing device, the incoming device and the predetermined reflecting device are provided in the rotating device. Further, the matter of supporting the respective predetermined reflecting device to the respective rotating device so that the predetermined device of one of the rotating devices reflects the outgoing medium Lo from the other outgoing device and incomes it to the other incoming device means that a direction of a reflecting surface of the predetermined reflecting device becomes substantially opposite to a direction of the outgoing and incoming surface of the outgoing device and the incoming device.

That is, the outgoing device and the incoming device directs the outgoing and incoming surface to the traveling direction during the travel, thereby detecting the obstacle, however, a mud and a snow from an advancing direction are easily attached to the outgoing and incoming surface, so that a detecting accuracy of the obstacle detecting apparatus is reduced. However, in accordance with the fourth aspect, since the reflecting surface of the predetermined reflecting device is directed to the direction substantially opposite to the traveling direction during the travel, it is hard that the mud and the snow are attached to the reflecting surface. Accordingly, it is possible to stably perform the monitoring by the monitoring mechanism. In this case, if it is structured such that the reflecting surface of the predetermined reflecting device can be covered during the travel, it is possible to more stably perform the monitoring by the monitoring mechanism.

Further, it is possible to replace "one" by "the other" and "the other" by "one". After replacement, it is said that "the respective predetermined reflecting devices are supported to the respective rotating devices so that the predetermined reflecting device of the other of the reflecting devices reflects the outgoing medium Lo from one of the outgoing devices and incomes it to one of the incoming device between at least two rotating devices". That is, it is possible to mutually monitor the rotating devices and the corresponding outgoing device, the incoming device and the predetermined reflecting device by means of the monitoring mechanism by rotating the rotating devices, for example, at 180 degrees. Further, since the predetermined reflecting device is provided in the rotating device, it is possible to save a space for placing the predetermined reflecting device in the narrow vehicle.

In accordance with a sixth aspect, there is provided a monitoring mechanism of an obstacle detecting apparatus for a vehicle having an outgoing device for outgoing a medium Lo such as a sound, a light, an electric wave and the like to a traveling direction of a vehicle, an incoming device for incoming a medium Li reflected by an obstacle existing in an outgoing direction of the medium Lo, a calculating device which receives the outgoing medium Lo from the outgoing device and the incoming medium Li in the incoming device and calculates a distance from the vehicle to the obstacle on the basis of a difference between them so as to define an existence of the obstacle on the basis of the distance, and being mounted on the vehicle, wherein the obstacle detecting apparatus is provided with a monitoring mechanism, said monitoring mechanism comprising a predetermined reflecting device arranged at a known position P0 near a traveling course in such a manner as to direct a reflecting surface within the course, a storing device for storing the known position P0 of the predetermined reflecting device of an own vehicle, an own vehicle position and direction detecting device for detecting a position Pi and a direction Pd of the own vehicle in the course, and a judging device connected to at least one of the storing device, the own vehicle position and direction detecting device, the incoming device and the calculating device, judging whether or not a medium Li incoming to the incoming device is a reflecting medium Li from the predetermined reflecting device on the basis of the known position P0 of the predetermined reflecting device read out from the storing device and the position Pi an the direction Pd of the own vehicle in the course from the own vehicle position and direction detecting device, comparing at least one of the incoming medium Li from the incoming device and the distance calculated by the calculating device with standards L1 to L2, E1 to E2 previously stored in correspondence to the at least one when judging that it is the reflecting medium Li, and further judging whether or not an abnormality exists in at least one of the obstacle detecting apparatus and the predetermined reflecting device on the basis of the comparison, and being mounted to the vehicle.

In accordance with the sixth aspect, the following operation and effect can be obtained. In the first to fifth aspect mentioned above, the predetermined reflecting device is provided in the vehicle, however, in the sixth aspect, the predetermined reflecting device is arranged at the known position P0 near the traveling course and the reflecting surface is arranged so as to be directed within the course. Further, since the judging device understands the known position P0 of the predetermined reflecting device and the position Pi and the direction Pd of the own vehicle in the course, it is possible to judge whether or not the incoming medium Li is the reflecting medium Li from the predetermined reflecting device. That is, it is possible to apply the principle in the first aspect mentioned above. That is, the matter of judging that "the incoming medium Li is the reflecting medium Li from the predetermined reflecting device" has the same meaning as the principle of the first aspect mentioned above that "when monitoring, the rotating device is directed to the predetermined reflecting device provided in the own vehicle and the existence of the predetermined reflecting device is confirmed by the obstacle detecting apparatus". The processes of the judging device thereafter are the same as those of the principle of the first embodiment mentioned above. Therefore, in accordance with the sixth aspect, the effects (4) to (6) in the first aspect mentioned above can be obtained. In this case, it is desirable that the predetermined reflecting device is provided at a point where the own vehicle travels at a low speed or near a stop point such as in an outside of the curve, near a fuel supply place for an engine, near a replacing point for an operator and the like. When the structure is made in the above manner, a monitoring error can be reduced.

In accordance with a seventh aspect, there is provided a monitoring mechanism of an obstacle detecting apparatus for a vehicle as cited in the sixth aspect, wherein the outgoing device and the incoming device are integrally supported on the rotating device in a freely rotatable manner.

In accordance with the seventh aspect, since the outgoing device and the incoming device are integrally supported on the rotating device in a freely rotatable manner, it is possible to additionally obtain the effects (1) to (3) of the first aspect mentioned above. Further, in the same manner as the sixth aspect mentioned above, in accordance with the seventh aspect, it is possible to judge an abnormality of the obstacle detecting apparatus, the predetermined reflecting device and the rotating device without an existence of the vehicle stop detecting device, without arranging a plurality of predetermined reflecting devices in the medium path Lo–Li and without arranging the predetermined reflecting device on the rotating device.

The first to seventh aspects mentioned above correspond to the monitoring mechanism applied to the transmitting and receiving type obstacle detecting apparatus for the vehicle. On the contrary, eighth to thirteenth aspect mentioned below correspond to a monitoring mechanism applied to a receiving type obstacle detecting apparatus for a vehicle. The eighth to thirteenth aspects correspond to a structure in which the outgoing device and the relating components are cancelled and the components are changed in accordance with the cancellation ("the predetermined reflecting device" and "the incoming device" are respectively changed to "a predetermined object" and "an image pickup device") in order to switch the first to third aspects and the fifth to seventh aspects of the transmitting and receiving type to the receiving type. Between the corresponding aspects, the operations achieving the respective effects are, strictly speaking, different, however, the respective effects are substantially the same. In this case, "the predetermined" in "the predetermined object" means "previously determined" (the same can be applied to "the predetermined" of "the predetermined reflecting device" in the first to seventh aspects). That is, an eighth aspect, a ninth aspect, a tenth aspect, an eleventh aspect, a twelfth aspect and a thirteenth aspect correspond to the first aspect, the second aspect, the third aspect, the fifth aspect, the sixth aspect and the seventh aspect, respectively.

In accordance with an eighth aspect, there is provided a monitoring mechanism of an obstacle detecting apparatus for a vehicle having an image pickup device which pickups an image of an obstacle existing in a traveling direction of a vehicle and a calculating device receiving an image pickup information Li from the image pickup device, calculating a distance from the vehicle to the obstacle and determining an existence of the obstacle on the basis of the distance, and being mounted to the vehicle, wherein the obstacle detecting device is provided with a monitoring mechanism, said monitoring mechanism comprising a rotating device rotatably supporting the image pickup device, a predetermined object arranged in such a manner as to be capable of inputting the image pickup information Li to the image pickup device when the rotating device rotates and the rotating angle θ becomes a predetermined angle range θ1 to θ2, a rotating angle detecting device detecting the rotating angle θ of the rotating device, and a judging device connected to at least one of the image pickup device and the calculating device and to the rotating angle detecting device, comparing at least one of the image pickup information Li from the image pickup device and the distance calculated by the calculating device with standards L1 to L2, E1 to E2 previously stored in correspondence to the at least one when the rotating angle θ from the rotating angle detecting device is a predetermined angle range θ1 to θ2 and judging whether or not an abnormality exists with respect to at least one of the obstacle detecting apparatus, the rotating device, the predetermined object and the rotating angle detecting device on the basis of the comparison, and being mounted to the vehicle.

In accordance with the eighth aspect, in the same manner as the first aspect, the following operation and effect can be obtained. The predetermined object corresponds to an object which is performed an image pickup by the image pickup device when the rotating device rotates and the rotating angle θ becomes the predetermined angle range θ1 to θ2, for example, is a triangle mark provided at a specified portion of the vehicle. That is, it corresponds to the predetermined reflecting device in the first to seventh aspects. Accordingly, as mentioned above, it is possible to monitor the obstacle detecting apparatus by the monitoring mechanism when the rotating angle θ of the rotating device corresponds to a relation "θ=θ1 to θ2", and it is possible to image pickup (detect) the normal obstacle when the relation "θ≠θ1 to θ2" is established. Then, when monitoring by the monitoring mechanism, the rotating device is directed to the predetermined object (θ=θ1 to θ2) so as to confirm the existence of the predetermined object by the obstacle detecting apparatus. Since both of the rotating device and the predetermined object are provided on the vehicle, the separated distance between the both is constant, so that various kinds of universal standards can be set. As a result, if there is a change when comparing a result of the image pickup the predetermined object with the standard, it can be of course judged that an abnormality exists in at least one of the obstacle detecting apparatus, the rotating device, the predetermined object and the rotating angle detecting device. The eighth aspect is structured on the basis of the effects mentioned above and the following effects can be obtained.

(1) Since the image pickup device is provided on the rotating device in a freely rotatable manner, it is possible to give an image pickup difference between two image pickup devices to the monitoring mechanism. Accordingly, the monitoring mechanism can monitor whether or not an abnormality of the image pickup device and the rotating device exist by the difference between them.

(2) Even when narrowing the image pickup view, it is possible to image pickup the obstacle existing in front of the curve by rotating the rotating device.

(3) Further, the monitoring by the monitoring mechanism is performed when the rotating angle θ of the rotating device is within the predetermined angle range θ1 to θ2. Then, the predetermined angle range θ1 to θ2 can be of course out of the normal image pickup view mentioned above. That is, the monitoring mechanism does not relate to the normal image pickup of the obstacle at all.

(4) Further, the monitoring by the monitoring mechanism is performed by a combination of the rotating angle θ and at least one of whether or not the image pickup information Li exists, the strength of the incoming medium Li and the distance to the predetermined object, so that the freedom of the combination is significantly high. In other words, a freedom of setting a comparative standard with respect to an information becomes significantly high. Accordingly, it is possible to set the standards L1 to L2 and/or E1 to E2 which can easily specify any one of the obstacle detecting apparatus, the rotating device, the predetermined object and the rotating angle detecting device causing the abnormality.

(5) Here, the eighth aspect will be supplemented.

In a normal image pickup of the obstacle, the rotating device may be structured such as not to be rotated, to be always rotated (particularly, in the case of using the medium having a narrowed angle of the ray in a large-sized vehicle or the like), or to be rotated as occasion demands (the case of the curve mentioned above or the like).

Further, it is desirable that the judging device can accurately recognize the rotating angle θ of the rotating device. Accordingly, there is provided the rotating angle detecting device for detecting the rotating angle θ of the rotating device, however, in a step motor, a driving pulse signal itself corresponds to the rotating angle θ. In this case, the rotating angle detecting device and a driving pulse signal oscillator have the same meaning.

Further, the calculating device and the judging device are described as mutually independent components, however, one component obtained by combining the judging device and the calculating device has the same meaning, and the structure mentioned above is included in the eighth aspect. The description is not given of a driving of the rotating device. This is because there is no difference in an operation and an effect of monitoring on the basis of the monitoring mechanism in the case of either an automatic drive or a manual drive.

In accordance with a ninth aspect, there is provided a monitoring mechanism of an obstacle detecting apparatus for a vehicle as cited in the eighth aspect, wherein the monitoring mechanism has a vehicle stop detecting device which detects a stop time of the vehicle so as to input a vehicle stop signal St to the judging device, the rotating device receives drive signals θa and θb from the judging device so as to be freely rotatable, and the judging device is connected to the vehicle stop detecting device and gives the drive signal θb to the rotating device when receiving the vehicle stop signal St from the vehicle stop detecting device so as to rotate the rotating device at a predetermined angle range θ1 to θ2.

In accordance with the ninth aspect, the following operation and effect can be obtained in the same manner as that of the second aspect. The monitoring mechanism serves a monitoring function when the vehicle stop signal St is received from the vehicle stop detecting device. Accordingly, since the monitoring is not performed during the travel, it is possible to prevent the monitoring accuracy from changing due to the oscillation of the vehicle, and first of all, the obstacle detecting apparatus can be intent on image pickup of the obstacle during the travel. In this case, the "stop time of the vehicle" detected by the vehicle stop detecting device corresponds to a neutral time of a transmission, an effective time of a parking brake, a stop time of an engine, a measured vehicle speed 0 time in the case of the vehicle having a vehicle speed meter, and the like, in the same manner as mentioned above.

In accordance with a tenth aspect, there is provided a monitoring mechanism of an obstacle detecting apparatus for a vehicle as cited in the eighth or ninth aspect, wherein the rotating device rotates the rotating angle θ at a predetermined angle range θ1 to θ2 at a predetermined time t.

In accordance with the tenth aspect, the following operation and effect can be obtained in the same manner as the third aspect. Since the predetermined time t is set, the monitoring mechanism can be operated at a time of traveling as well as when the vehicle is at a certain time during the stop time or at every vehicle stop times. In this case, it is preferable to be intent on detecting the obstacle during the travel, however, since the time for operating the monitoring mechanism can be achieved by about one some second, it is possible to operate the monitoring mechanism the predetermined time t. That is, a freedom of the monitoring mechanism at the operating time is increased.

In accordance with an eleventh aspect, there is provided a monitoring mechanism of an obstacle detecting apparatus for a vehicle as cited in the eighth, ninth or tenth, wherein there is provided a plurality of rotating devices supporting the image pickup device in a freely rotatable manner, and the respective rotating devices are arranged so that one of the rotating devices corresponds to the predetermined object for the image pickup device of the other rotating device between at least two rotating devices when simultaneously rotating the rotating devices at a predetermined angle range θ1 to θ2.

In accordance with the eleventh aspect, in the same manner as that of the fifth aspect, the following operation and effect can be obtained.

(1) Since there are provided a plurality of rotating devices, it is possible to narrow the image pickup view of the image pickup device, so that it is possible to detect only the obstacle on the course. That is, it is possible to preferably use in a vehicle having a great vehicle width and a great vehicle length such as a large-sized vehicle for a mine and the like.

(2) The matter that the respective rotating devices are arranged so that one of the rotating devices corresponds to the predetermined object for the image pickup device of the other rotating device between at least two rotating devices when simultaneously rotating a plurality of rotating devices at a predetermined angle range θ1 to θ2, means that the image pickup device of the other rotating device image pickups one of the rotating devices itself. Then, it is possible to set the rotating device itself to have a shape, a color and the like easily performed an image pickup and easily judged. Of course, it is possible to independently provide a member having a shape, a color and the like easily performed an image pickup and easily judged in the rotating device.

(3) The eleventh aspect corresponds to an aspect which can monitor the mutual image pickup device by the monitoring mechanism in the same manner as that of the fifth aspect mentioned above. Accordingly, when the shape, the color and the like easily performed an image pickup and easily judged are provided on a back surface of the image pickup device, it is hard that the mud, the snow and the like are attached thereto during the travel, so that it is possible to accurately perform the monitoring by means of the monitoring mechanism.

In accordance with a twelfth aspect, there is provided a monitoring mechanism of an obstacle detecting apparatus for a vehicle having an image pickup device which pickups an image of obstacle existing in a traveling direction of a vehicle, and a calculating device receiving an image pickup information Li from the image pickup device, calculating a distance from the vehicle to the obstacle and determining an existence of the obstacle on the basis of the distance, and being mounted to the vehicle, wherein the obstacle detecting device is provided with a monitoring mechanism, said monitoring mechanism comprising a predetermined object device arranged at a known position P0 near a traveling course, a storing device for storing the known position P0 of the predetermined object device of an own vehicle, an own vehicle position and direction detecting device for detecting a position Pi and a direction Pd of the own vehicle in the course, and a judging device connected to at least one of the storing device, the own vehicle position and direction detecting device, the image pickup device and the calculating device, judging whether or not an image pickup information Li from the image pickup device is an image pickup information Li from the predetermined object on the basis of the known position P0 of the predetermined object read out from the storing device and the position Pi an the direction Pd of the own vehicle in the course from the own vehicle position and direction detecting device, comparing at least one of the image pickup information Li from the image pickup device and the distance calculated by the calculating device with standards L1 to L2, E1 to E2 previously stored in correspondence to the at least one when judging that it is the image pickup information Li, and further judging whether or not an abnormality exists in at least one of the obstacle detecting apparatus and the predetermined object on the basis of the comparison, and being mounted to the vehicle.

In accordance with the twelfth aspect, in the same manner as that of the sixth aspect mentioned above, the following operation and effect can be obtained. In the eighth to eleventh aspect mentioned above, the predetermined object (the rotating device itself in the case of the eleventh aspect) is provided in the vehicle, however, in the twelfth aspect, the predetermined object is arranged at the known position P0 near the traveling course. Further, since the judging device understands the known position P0 of the predetermined object and the position Pi and the direction Pd of the own vehicle in the course, it is possible to judge whether or not the image pickup information Li is the image pickup information Li from the predetermined object. That is, it is possible to apply the principle in the first and eighth aspects mentioned above. That is, the matter of judging that "the image pickup information Li is the reflecting medium Li from the predetermined object" has the same meaning as the principle of the eighth aspect mentioned above that "when monitoring, the rotating device is directed to the predetermined object provided in the own vehicle and the existence of the predetermined object is confirmed by the obstacle detecting apparatus". The processes of the judging device thereafter are the same as those of the eighth embodiment, so that the same effect can be obtained.

In accordance with a thirteenth aspect, there is provided a monitoring mechanism of an obstacle detecting apparatus for a vehicle as cited in the twelfth aspect, wherein the image pickup device is supported on the rotating device in a freely rotatable manner.

In accordance with the thirteenth aspect, in the same manner as that of the twelfth aspect mentioned above, the following operation and effect can be obtained. That is, since the image pickup device is rotatably supported on the rotating device, the following advantages can be obtained.

(1) Even when narrowing the image pickup view, it is possible to image pickup the obstacle existing in front of the curve by rotating the rotating device.

(2) Further, the monitoring by the monitoring mechanism is performed when the rotating angle θ of the rotating device is within the predetermined angle range θ1 to θ2. Then, the predetermined angle range θ1 to θ2 can be of course out of the normal image pickup view mentioned above. That is, the monitoring mechanism does not relate to the normal image pickup of the obstacle at all.

(3) The monitoring by the monitoring mechanism is performed by a combination of the rotating angle θ and at least one of whether or not the image pickup information Li exists, the strength of the incoming medium Li and the distance to the predetermined object, so that the freedom of the combination is significantly high. In other words, a freedom of setting a comparative standard with respect to an information becomes significantly high. Accordingly, it is possible to set the standards L1 to L2 and/or E1 to E2 which can easily specify any one of the obstacle detecting apparatus, the rotating device, the predetermined object and the rotating angle detecting device causing the abnormality.

(4) It is possible to judge an abnormality of the obstacle detecting apparatus, the predetermined reflecting device and the rotating device without an existence of the vehicle stop detecting device, and without arranging the predetermined reflecting device on the rotating device.

DETAILED DESCRIPTION OF PREFERRED EMBODIMENTS

An embodiment of a monitoring mechanism of an obstacle detecting apparatus for a vehicle in accordance with the present invention will be described below with reference to FIGS. 1 to 8C.

Figure 1:
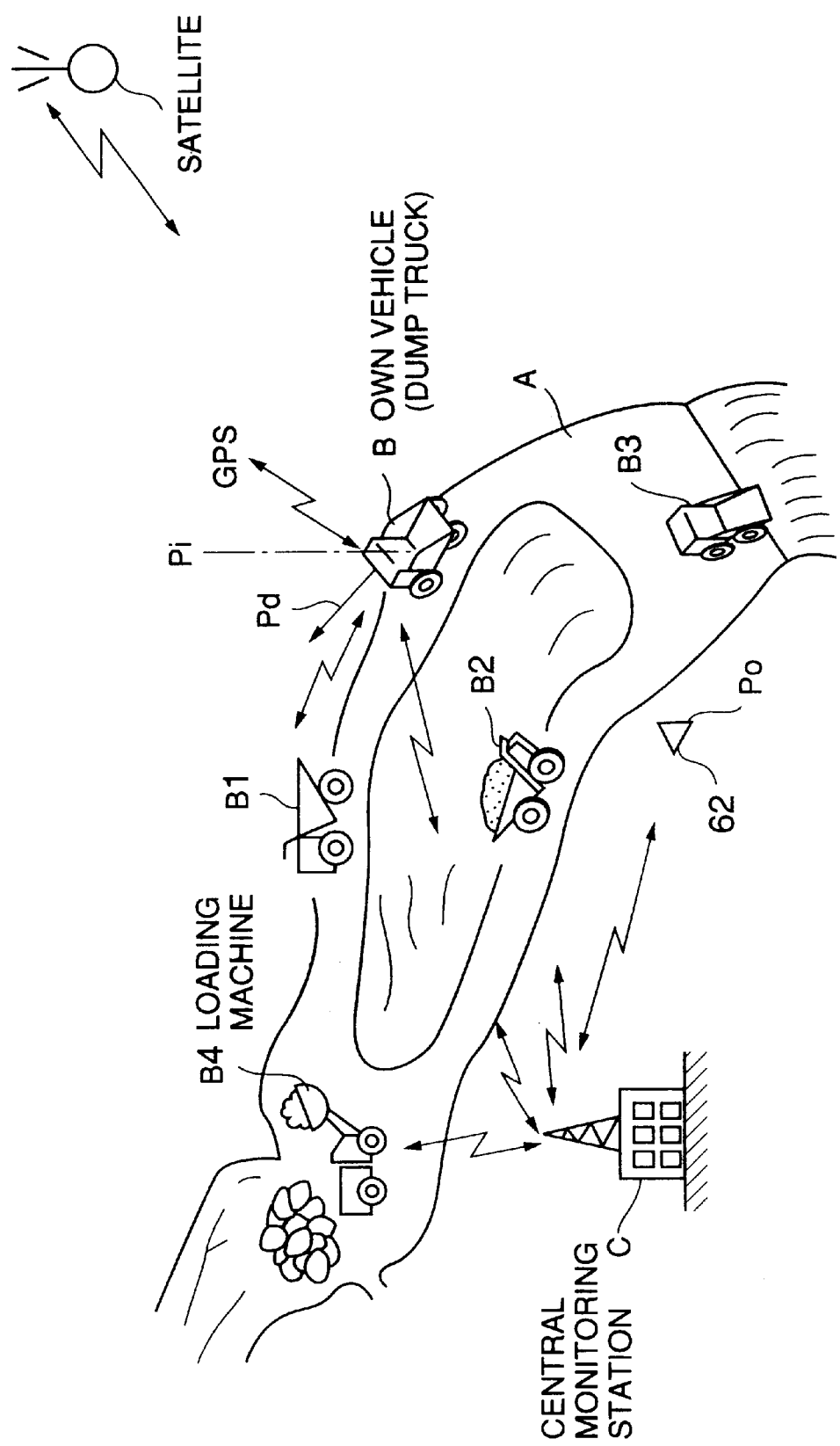
FIG. 1 is a schematic view of an unmanned dump truck which travels on a fixed course.
Figure 2:
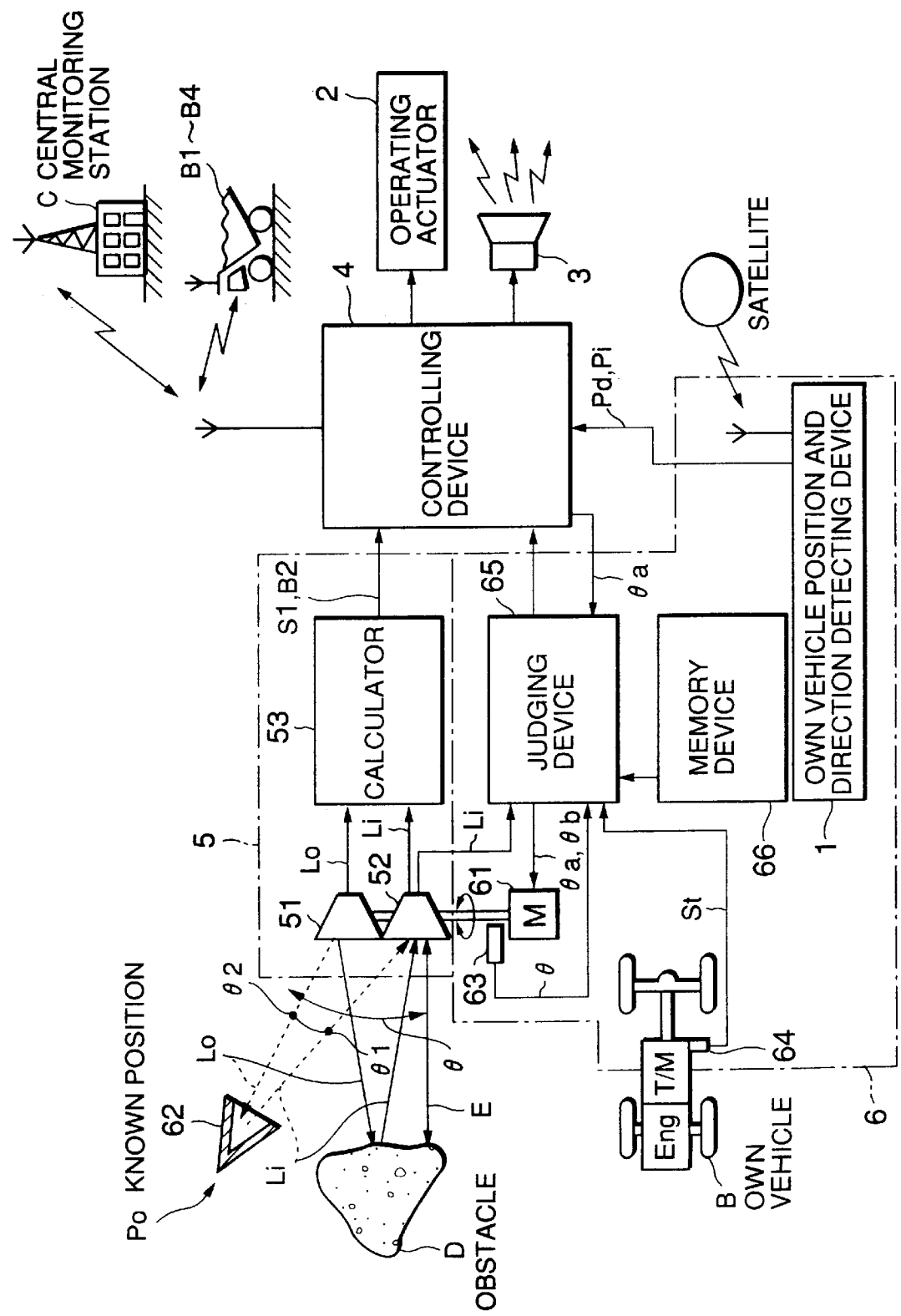
FIG. 2 is a block diagram of a control of a monitoring mechanism in accordance with a first embodiment of the present invention.

An embodied apparatus mounting a first embodiment is a large-sized unmanned dump truck B (hereinafter, refer to as an own vehicle B) which runs on a fixed course A such as a mine and the like, as shown in FIG. 1. This has an own vehicle position and direction detecting device 1 which previously stores a course data and detects a position Pi and a direction Pd of the own vehicle B on the course A by means of a global positioning system (GPS) and an optical fiber gyroscope, an actuator 2 for driving an accelerator, a brake, a steering, a transmission, a vessel ascending and descending hydraulic pressure apparatus and the like, an alarm, and a controlling device 4 connected to them, as shown in FIG. 2. The controller 4 is, for example, constituted by a micro computer and the like, and is further connected to a wireless system with respect to the other unmanned dump trucks B1 to B3, a loading machine B4 and a central monitoring station C. Then, the controlling device 4 is communicated by wireless with the other vehicles B1 to B4 and the central monitoring station C via the wireless system so that the own vehicle B is controlled with a fleet containing the other vehicles B1 to B4. The driving actuator 2 and the alarm 3 are operated by receiving the communication result and the position Pi and the direction Pd of the own vehicle B on the course A from the own vehicle position and direction detecting device 1 on the basis of a previously stored operation program, whereby the own vehicle B is self propelled. Then, the own vehicle B (the other vehicles B1 to B4 also) has the obstacle detecting apparatus 5 described next.

The obstacle detecting apparatus 5 is provided for the purpose of detecting an emergency trouble in the wireless system, a vehicle having no wireless system and unallowably entering into the course, a falling rock, an animal, the near other vehicles B1 to B4 under an emergency and the like, and automatically responding. These materials comprising the vehicle having no wireless system and unallowably entering into the course, the falling rock, the animal, the near other vehicles B1 to B4 under an emergency and the like correspond to obstacles D to be detected by the obstacle detecting apparatus 5.

An outgoing device 51 (i.e., a transmitter) and an incoming device 52 (i.e., receiver) of the obstacle detecting apparatus 5 are provided on a front bumper of the own vehicle B, and as shown in FIG. 2, the outgoing device 51 outgoes a medium (i.e., transmits a signal) such as a sound, a light, an electric wave and the like (a laser light Lo in the first embodiment) to a traveling direction (a forward direction) of the own vehicle B. The incoming (i.e., receives) device 52 incomes a laser light Li reflected by the obstacle D existing in an outgoing direction of the laser light Lo. A calculating device 53 is electrically connected to the outgoing device 51 and the incoming device 52, receives the laser light Lo from the outgoing device 51 and the laser light Li in the incoming device 52, calculates a distance E from the own vehicle B to the obstacle D on the basis of a time difference between an outgoing time of the laser light Lo and an incoming time of the laser light Li, and determines an existence of the obstacle D on the basis of the distance E. Then, the calculating device 53 inputs the determined information to the controlling device 4 and operates the driving actuator 2, thereby reducing a speed of the own vehicle B and suddenly stopping the vehicle so as to prevent the own vehicle B from being in contact with and colliding with the obstacle D. At the same time, the alarm 3 is operated so as to alarm an existence of the own vehicle B to the disallowable manned vehicle entering to the course, the animal and the like. The obstacle detecting apparatus 5 mentioned above further has the following monitoring mechanism 6.

The monitoring mechanism 6 is structured so as to include an own vehicle position and direction detecting device 1, a rotating device 61, a predetermined reflecting device 62, a rotating angle detecting device 63, a vehicle stop detecting device 64 and a judging device 65.

The own vehicle position and direction detecting device 1 inputs the position Pi and the direction Pd of the own vehicle B on the course A to the controlling device 4 and is useful for a self-propel of the own vehicle B.

The rotating device 61 integrally supports the outgoing device 51 and the incoming device 52 in a freely rotatable manner. In this case, the rotating device 61 inherently rotates by receiving a drive signal θa as mentioned above, and is structured such as to be capable of detecting the obstacle D. That is, the controlling device 4 generates a normal drive signal θa by receiving a previously stored course data and the position Pi and the direction Pd of the detected own vehicle B from the own vehicle position and direction detecting device 1, and inputs them to the rotating device 61 so as to rotate. For example, when the own vehicle B comes near a curve portion of the course A, the own vehicle position and direction detecting device 1 inputs the curve data and the position Pi and the direction Pd of the own vehicle B in this side of the curve to the controlling device 4. Then, the controlling device 4 generates the drive signal θa corresponding to the curve and inputs it to the rotating device 61 so as to rotate the rotating device 61, thereby capable of detecting the obstacle D on the curve.

In this case, the rotating device 61 in the first embodiment receives the drive signal θa from the controller 4 via the judging device 65, however, it is possible to receive a drive signal θb generated in the judging device 65 in place of the drive signal θa. When receiving the drive signal θb, the rotating device 61 rotates so that the ray of the outgoing device 51 and the incoming device 52 (the ray of the laser light Lo and the laser light Li) is within a predetermined angle range θ1 to θ2. That is, when rotating by receiving the drive signal θb, the rotating angle θ of the rotating device 61 satisfies the relation "θ=θ1 to θ2 (for example, θ1=80 degrees and θ2=90 degrees)", and on the contrary, when rotating by receiving the drive signal θa, the rotating angle θ of the rotating device 61 satisfies "θ≠θ1 to θ2 (for example, θ<70 degrees or θ>100 degrees)". The predetermined reflecting device 62 is arranged on a portion a predetermined distance (for example, 50 cm) apart from the rotating device 61, for example, on a front bumper of the own vehicle B, and so that when the rotating device 61 rotates at a predetermined angle range θ1 to θ2, the reflecting surface of the predetermined reflecting device 62 is directed to the ray of the outgoing device 51 and the incoming device 52 on the rotating device 61.

The rotating angle detecting device 63 detects the rotating angle θ of the rotating device 61 so as to input to the judging device 65.

The vehicle stop detecting device 64 detects a vehicle stop time of the own vehicle B and inputs a vehicle stop signal St to the judging device 65. For example, it is sufficient to detect a neutral time of a transmission, an effect time of a parking brake, a stop time of an engine, a 0 time of a measured vehicle speed in the case of the vehicle B having a vehicle speed meter and the like, thereby generating the vehicle stop signal St. In the first embodiment, the vehicle stop detecting device 64 is provided in a transmission T/M so as to detect a neutral time of the transmission T/M and output the vehicle stop signal St.

The judging device 65 receives the drive signal θa from the controller 4, gives the drive signal θb (or θa) to the rotating device 61, receives the rotating angle θ from the rotating angle detecting device 63, and receives the vehicle stop signal St from the vehicle stop detecting device 64. Further, the judging device 65 is connected to a memory device 66, the incoming device 52 and the controlling device 4, receives a monitoring program previously stored in the memory device 66, the predetermined angle range θ1 to θ2 used in the monitoring program and a standard strength range L1 to L2 from the memory device 66, receives the laser light Li (particularly, a strength L of the laser light Li) from the incoming device 52, treats them on the basis of the monitoring program and outputs the treated result to the controlling device 4.

The controlling device 4 operates the driving actuator 2 and the alarming device 3 on the basis of the previously stored drive program by receiving the treated result from the judging device 65. Further, the controlling device 4 transmits by wireless the information such as the control result to the driving actuator 2 and the alarm device 3, the treated result in the judging device 65, the position Pi and the direction Pd of the own vehicle B on the course A and the like to the central monitoring station C.

The central monitoring station C processes on the basis of a previously stored fleet program by receiving the information from the controlling device 4. In this case, the fleet means "a squadron" and the fleet program means a plan of simultaneously controlling a plurality of vehicles in an optimum manner. The fleet program is independent from the operating program for a self-propelling which the controlling devices 4 of the respective vehicles B and B1 to B4 store. The fleet program is structured such as to input an interruption signal to each of the operating programs so as to achieve the fleet when each of the vehicles B and B1 to B4 judges that the fleet operation with the other vehicles B1 to B4 can not be achieved only by the self-propelling in the obstacle detecting apparatus 5 and the like. For example, the central monitoring station C ignores each of the information when comparing the information from the controlling device 4 with the previously stored various kinds of standards and judging that each of the information is light with respect to the fleet. Further, when judging that each of the information gives an influence to the fleet, the central monitoring station C inputs the optimum interruption control signal to the operating actuator 2 of the vehicles B and B1 to B4 by wireless in order to remove the influence. Further, when judging that each of the information can not be processed only by the existing fleet program, the central monitoring station C alarms to an operator belonging to the central monitoring station C by the alarm within the central monitoring station C, and inputs the interruption control signal to the fleet program itself and the operating program of each of the vehicles B and B1 to B4 in accordance with a manual input by the operator.

A summary of a monitoring program which the judging device 65 reads out from the memory device 66 so as to process will be described below with reference to a flow chart of FIG. 3.

(Step 1) During the travel, the judging device 65 inputs the drive signal θa to the rotating device 61 until receiving the vehicle stop signal St from the vehicle stop detecting device 64. Accordingly, the rotating device 61 is normally rotated (for example, "θ<θ1"), and detects the obstacle D existing on the course A in the traveling direction of the own vehicle B.

(Step 2) When receiving the vehicle stop signal St from the vehicle stop detecting device 64, the judging device 65 inputs the drive signal θb generated in the judging device 65 to the rotating device 61 in place of the current drive signal θa, thereby rotating the rotating device 61 within the predetermined angle range θ1 to θ2. A judgement whether or not the rotating angle θ is within the predetermined angle range θ1 to θ2 is performed by the judging device 65 receiving the rotating angle θ from the rotating angle detecting device 63 (θ1≦θ≦θ2).

(Step 3) At this time (θ1≦θ≦θ2), the judging device 65 compares a strength L of the laser light Li from the incoming device 52 with the standard strength range L1 to L2.

(Step 31) When the comparative result is "L1>L2", a periphery of the obstacle detecting apparatus 5 is normal, so that the result is not input to the controlling device 4 and the drive signal θb is switched to the drive signal θa.

(Step 32) When the comparative result is "L1≦L≦L2", a signal S1 corresponding to "an abnormal sign" is input to the controlling device 4. The controlling device 4 operates the brake while loosening, for example, an accelerator among the operating actuator 2, thereby reducing the speed of the own vehicle B. Further, the controlling device 4 transmits the "abnormal sign" to the central monitoring station C by wireless. The central monitoring station C alarms to the operator and plans an early inspection with respect to the obstacle detecting apparatus 5 of the own vehicle B. In this case, since the "abnormal sign" includes not only the obstacle detecting apparatus 5 but also the rotating device 61, the predetermined reflecting device 62 and the rotating angle detecting device 63, the inspection is performed to them.

(Step 33) When the comparative result is "L<L1", a signal S2 corresponding to "a generation of abnormality" is input to the controlling device 4. The controlling device 4 operates the brake while loosening, for example, an accelerator among the operating actuator 2, thereby stopping the own vehicle B. Further, the controlling device 4 transmits the "generation of abnormality" to the central monitoring station C by wireless. The central monitoring station C alarms to the operator and alarms an emergency inspection command with respect to the obstacle detecting apparatus 5 of the own vehicle B. In this case, since the "generation of abnormality" also includes not only the obstacle detecting apparatus 5 but also the rotating device 61, the predetermined reflecting device 62 and the rotating angle detecting device 63, the inspection is performed to them.

Next, second to twentieth embodiments will be described below as the other embodiments.

A second embodiment is as follows. In the first embodiment, the outgoing device 51 and the incoming device 52 are provided in such a manner as to direct to the forward direction of the own vehicle B, however, in a vehicle having an obstacle detecting apparatus 5 for detecting a backward obstacle D at a time of backward moving and a sideward obstacle D, it is desirable that a monitoring mechanism 6 is provided in each of them.

A third embodiment is as follows. In the first embodiment, the drive signal θb is automatically input to the rotating device 61, however, since it is sufficient to achieve a function of the monitoring mechanism 6, the rotating device 61 may be manually rotated by the operator so as to achieve the predetermined angle range θ1 to θ2. In this case, the function of generating the drive signal θb in the judging device 65 in accordance with the first embodiment is not required.

A fourth embodiment is as follows. In the first embodiment, the judging device 65 inputs the strength L of the laser light Li from the incoming device 52, however, it is possible to input the strength L of the laser light Li via the calculating device 53. In this case, it is possible to input the distance E to the predetermined reflecting device 62 solely or together with the strength L of the incoming medium Li from the calculating device 53. Accordingly, the structure may be made such that the judging device 65 compares the calculated distance E with the standard distance range E1 to E2 and judges whether or not an abnormality exists in the obstacle detecting apparatus 5, the rotating device 61, the predetermined reflecting device 62 and the rotating angle detecting device 63 on the basis of the comparison. In this case, a preferable example of the monitoring program in the judging device 65 will be shown in a flow chart in FIG. 4. In this case, FIG. 4 corresponds to a flow chart in which a process of inputting the distance E between the steps 2 and 3 so as to compare with the standard distance range E1 to E2 and going to the process 3 when the relation "E1≦E≦E2" is established and to the process 33 when the relation "E<E1" or "E>E2" is established is added to the flow chart shown in FIG. 3. Since the other matters are the same as those of the flow chart in FIG. 3, an overlapping explanation will be omitted.

Figure 3:
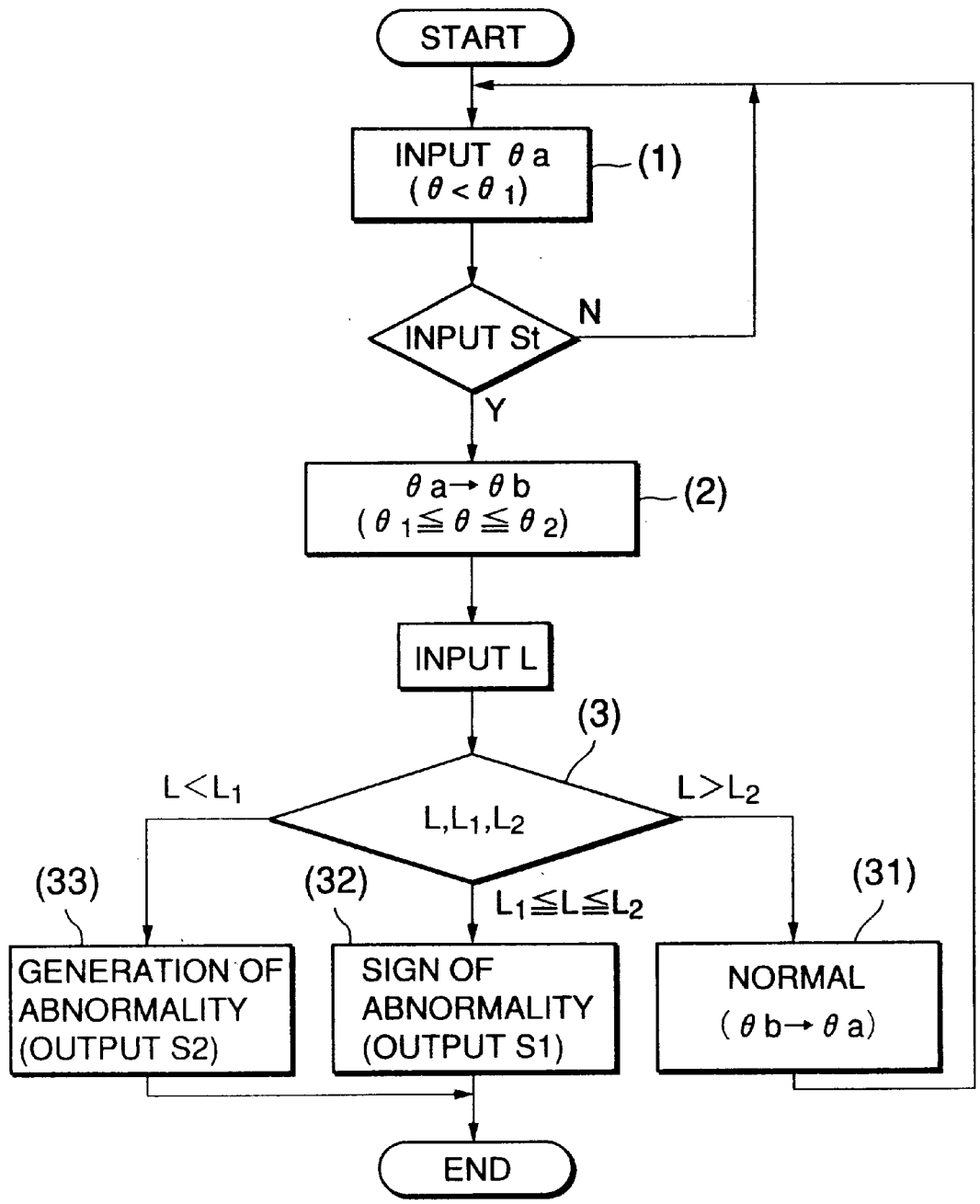
FIG. 3 is a flow chart of a monitoring in accordance with the first embodiment of the present invention.
Figure 4:
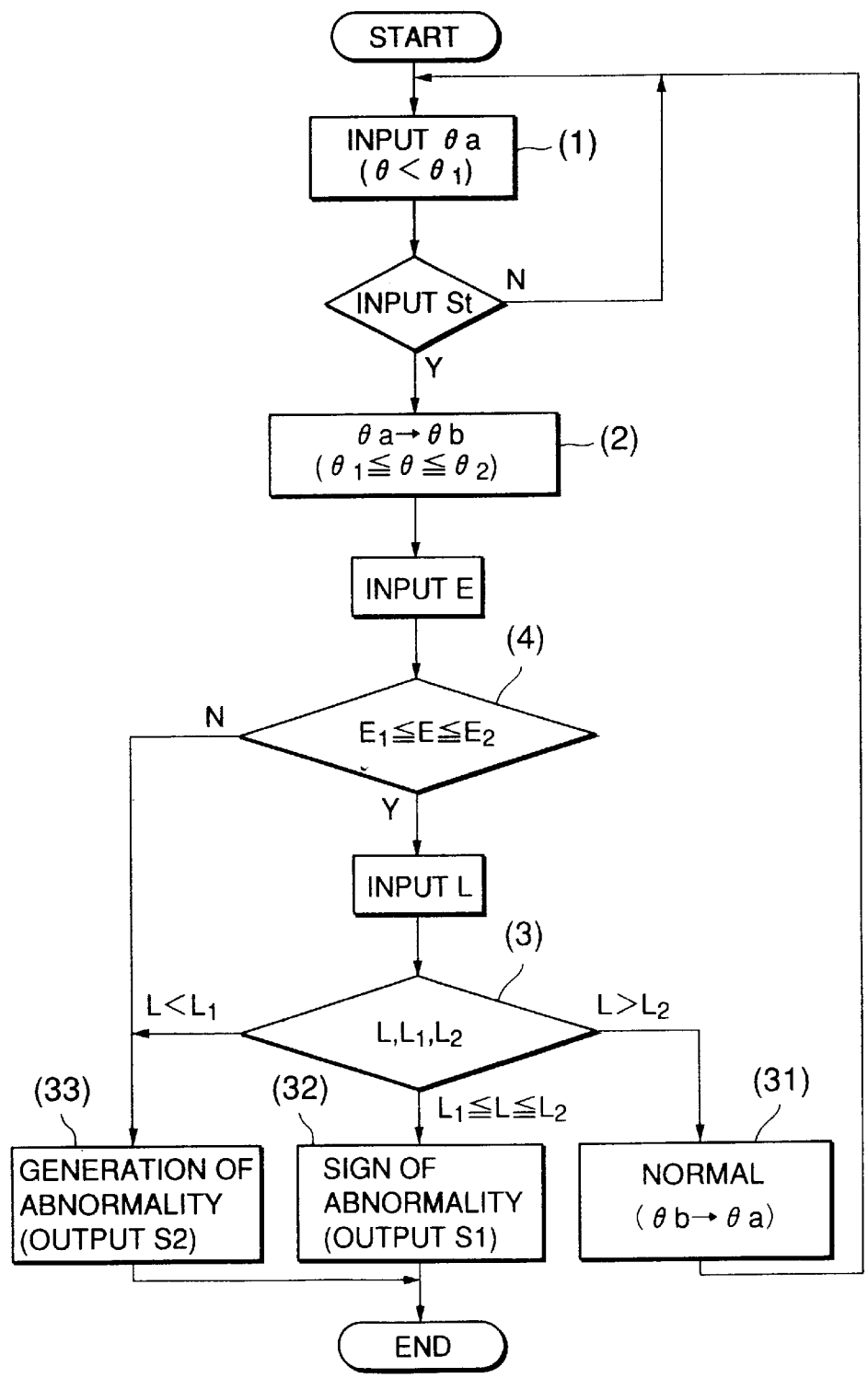
FIG. 4 is a flow chart of a monitoring in accordance with another embodiment of the present invention.
Figure 5:
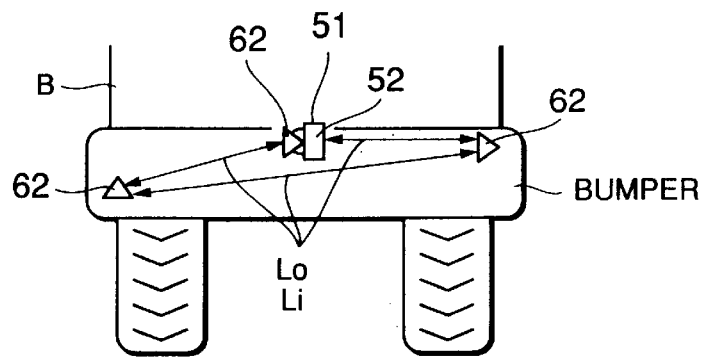
FIG. 5 is a partly front elevational view of a vehicle in which a plurality of reflecting devices are arranged on a bumper.

In accordance with the flow chart in FIG. 4, the following advantages can be obtained in comparison with the flow chart in FIG. 3. Since the distance E from the outgoing device 51 and the incoming device 52 to the predetermined reflecting device 62 is constant (this is set to "E1≦E≦E2" in the flow chart in FIG. 4), "the generation of abnormality" apparently occurs if the relation "E<E1" or "E>E2" is established, so that it is possible to move to the step 33 with omitting the step 3. Then, it is possible to pursue a cause of abnormality only about the distance E.

A fifth embodiment is as follows. In the first embodiment, the medium is set to the laser light Lo, however, the other mediums such as the ultrasonic wave, the infrared light, the millimeter wave and the like may be employed. For example, in the millimeter wave, in the same manner as the first embodiment, it is possible to calculate the distance E from the difference between the time of the outgoing millimeter wave and the time of the incoming millimeter wave, however, it is possible to perform a two-frequency CW method and an FM-CW method for tuning the millimeter wave (a conveying wave) by a triangle wave (a signal wave) so as to freely detect a relative speed between the obstacle D and the exemplified apparatus B in addition to the distance to the obstacle D (or the predetermined reflecting device 62). Further, it is possible to simultaneously detect a plurality of obstacles D (or the predetermined reflecting devices 62) together with the respective distances E by employing a frequency analysis such as a filter bank method, a fast Fourier transform (FFT) and the like. Accordingly, in the obstacle detecting apparatus 5 which can understand the distance E as mentioned above, it is possible to perform the process using the flow chart in FIG. 4 mentioned above. Of course, it is possible to perform the process employing the flow chart in FIG. 3. Further, it is possible to judge whether or not an abnormality exists by only the distance E without using the strength L of the incoming medium Li.

A sixth embodiment is as follows. In the first embodiment, the structure is made such that when the judging device 65 receives the vehicle stop signal St from the vehicle stop detecting device 64, the judging device 65 inputs the drive signal θb to the rotating device 61, it is possible to input it at a predetermined time t. In this case, the vehicle stop detecting device 64 is not required. As the predetermined time t, for example, in the case of immediately after entering to a straight course and detecting no obstacle D, it is desirable to employ a time when the rotating angle θ becomes the predetermined angle range θ1 to θ2 by rotating the rotating device 61 at a slight angle Δθ from the rotating angle θ on the basis of the drive signal θa. In this case, even when taking a mechanical response of the rotating device 61 into consideration, 0.2 to 0.3 seconds of the monitoring time is sufficient. This can sufficiently stand against the use since for example, the dump truck for the mine has a traveling distance of 3 to 5 m at the most at the maximum speed of 60 km/h.

A seventh embodiment is as follows. In the first embodiment, no attention is paid to a number of the arranged predetermined reflecting devices 62, however, a plurality of predetermined reflecting devices 62 may be arranged in the medium path Lo–Li from the outgoing device 51 to the incoming device 52. For example, in FIG. 5, three predetermined reflecting devices 62, 62 and 62 are arranged in the medium path Lo–Li from the outgoing device 51 to the incoming device 52. When the structure is made in this manner, a distance searching error is cancelled at a degree that the medium path Lo–Li is lengthened, so that it is possible to accurately process the monitoring program of the flow chart in FIG. 4.

An eighth embodiment is as follows. In the first embodiment, the rotating angle detecting device 63 is separated from the judging device 65 and independently provided, however, as far as the rotating device 61 is structured such as to control the rotating angle θ thereof from the outer portion (corresponding to the judging device 65 in the first embodiment) such as a step motor, the judging device 65 can process the drive signal θb (a pulse signal in the step motor, in this case, the drive signal θa is also generated in the judging device 65) generated in the inner portion as the rotating angle θ. Therefore, in accordance with the structure mentioned above, the rotating angle detecting device 63 is not required. That is, in this case, the judging device 65 has the same meaning as the rotating angle detecting device 63.

A ninth embodiment is as follows. In the first embodiment, no attention is paid to a number of the rotating devices 61, however, it is preferable to arrange a plurality of rotating devices 61 with respect to the large-sized vehicle for the mine and the like so that the ray of the respective outgoing devices 51 and incoming devices 52 is in a traveling direction of the same vehicle and positions of arrangement are different from each other. That is, since the large-sized dump truck B for the mine and the like has a wide vehicle width W, it is necessary to widen the ray of the outgoing device 51 and the incoming device 52 if only one rotating device 61 having a pair of outgoing device 51 and incoming device 52 is provided, so that there is a problem of detecting even the obstacle D out of the course A. Then, the problem mentioned above can be solved by arranging a plurality of rotating devices 61 having the outgoing devices 51 and the incoming devices 52 with the narrow rays. In this case, it is desirable to structure in the following manner.

Figure 6A:
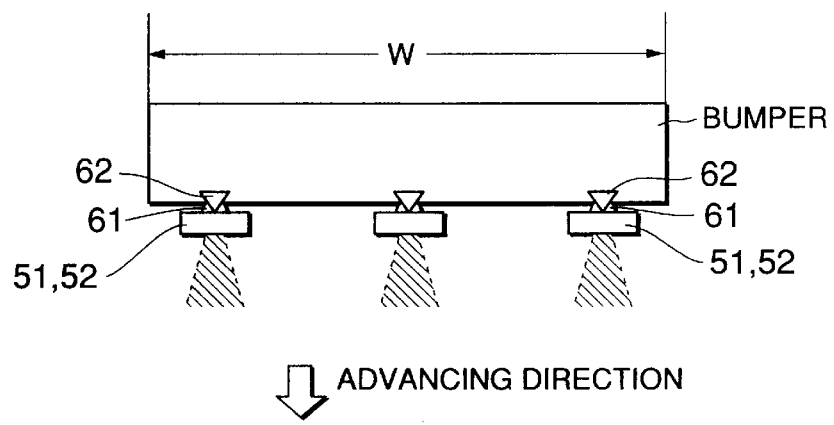
FIG. 6A is a schematic view as seen from an upper portion showing a vehicle in which a plurality of rotating devices provided with backward reflecting devices are arranged on a bumper.

For example, as shown in FIG. 6A, three rotating devices 61 are arranged on the bumper so as to be apart from each other. At this time, each of the rotating devices 61 has the predetermined reflecting device 62 in addition to the outgoing device 51 and the incoming device 52 and integrally fixes them in a freely rotatable manner. At this time, each of the predetermined reflecting devices 62 is fixed in the following manner. That is, when detecting the obstacle D, the outgoing device 51 and the incoming device 52 of each of the rotating devices 61 is directed to an advancing direction (a forward direction) of the own vehicle B by changing the ray, as shown in FIG. 6A, however, each of the predetermined reflecting devices 62 is directed to an opposite direction (a backward direction).

Figure 6B:
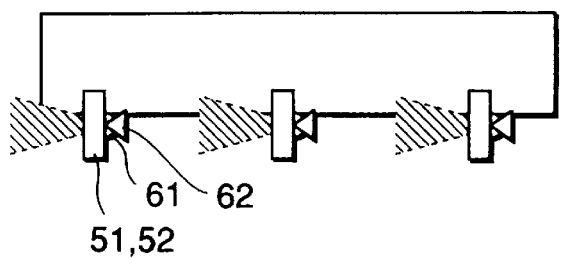
FIG. 6B is a schematic view in the case of sideward reflecting devices.
Figure 6C:
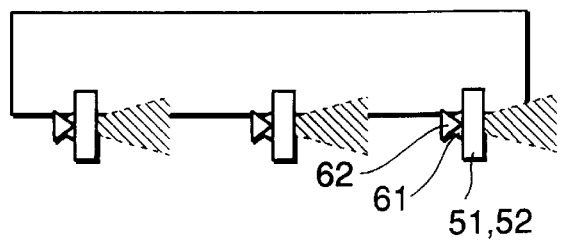
FIG. 6C is a schematic view in the case of opposite sideward reflecting devices.

The monitoring mechanism 6 is operated, at first, as shown in FIG. 6B, and all the rotating devices 61 are rotated at 90 degrees in a leftward direction. At this time, the predetermined reflecting device 62 on the left rotating device 61 reflects the medium from the outgoing device 51 on the central rotating device 61 to the incoming device 52 on the central rotating device 61. The predetermined reflecting device 62 on the central rotating device 61 reflects the medium from the outgoing device 51 on the left rotating device 61 to the incoming device 52 on the left rotating device 61. Accordingly, it is possible to monitor whether good or bad the left and center rotating devices 61 and the predetermined device 62 on the rotating device 61 in the left side of the drawing are. However, it is not possible to monitor whether good or bad the outgoing device 51 and the incoming device 52 on the right rotating device 61 are. Then, all the rotating devices 61 are rotated at 90 degrees in a rightward direction, as shown in FIG. 6C. accordingly, it is possible to monitor whether good or bad the outgoing device 51 and the incoming device 52 on the right rotating device 61 are. That is, when arranging each of the predetermined reflecting devices 62 in a relation of reflecting the medium from the outgoing device 51 on the other rotating device 61 to the incoming device 52 on the other rotating device 61, all the reflecting devices can be monitored.

In this case, in FIGS. 6A to 6C, the reflecting relation of the predetermined reflecting device 62 between the adjacent rotating devices 61 is described, however, for example, between the predetermined reflecting devices 62 of alternate rotating devices 61, it is sufficient to have the reflecting relation of the predetermined reflecting device 62. In addition, only a slight time is required for operating the monitoring mechanism 6. At the other long time, since each of the reflecting devices 62 is directed to the opposite direction to the advancing direction (the backward direction), as shown in FIG. 6A, it is hard that the mud, the snow and the like are attached to the reflecting surface even during the travel. Further, even when operating the monitoring mechanism 6, each of the predetermined reflecting devices 62 is directed to a direction perpendicular to the advancing direction (a lateral direction), as shown in FIGS. 6B and 6C, so that it is hard that the mud, the snow and the like are attached to the reflecting surface. That is, a maintenance can be easily performed and a long service life can be obtained.

A tenth embodiment is as follows. In the first embodiment, the predetermined reflecting device 62 is provided in the own vehicle B, however, it is possible to arrange it at the known position P0 near the traveling course A in such a manner as to direct the reflecting surface within the course A. In this case, the monitoring mechanism is constituted by the memory device 66, the own vehicle position and direction detecting device 1 and the judging device 65 in addition to the judging device 65. That is, the memory device 66 previously stores the known position P0 of the predetermined reflecting device 62 and the monitoring program in the judging device 65 unlike the first embodiment.

The own vehicle position and direction detecting device 1 detects the position Pi and the direction Pd of the own vehicle B on the course A and inputs to the judging device 65 in the same manner as that of the first embodiment (in the first embodiment, inputs to the controlling device 4 not to the judging device 65, however, in the tenth embodiment, inputs the position Pi and the direction Pd of the own vehicle B on the course A to the controlling device 4 and the judging device 65).

The judging device 65 is substantially the same at the following first point, different at a second point and the same at a third point in comparison with the first embodiment. That is, the first point corresponds to a point at which the judging device 65 is connected to at least one of the memory device 66, the own vehicle position detecting device 1, the incoming device 52 and the calculating device 53, and the controlling device 4. Here, "at least one of the incoming device 52 and the calculating device 53" will be described. The former incoming device 52 is a setting condition on the assumption of processing the monitoring program in FIG. 3, and on the contrary, the later calculating device 53 is a setting condition on the assumption of processing the flow chart in FIG. 4.

The second point is a point at which the judging device 65 after receiving the first point mentioned above judges whether or not the laser light Li incoming to the incoming device 52 is the reflecting medium Li from the predetermined reflecting device 62 on the basis of the known position Po of the predetermined device 62 read out from the memory device 66 and the position Pi and the direction Pd of the own vehicle B on the course A output from the own vehicle position and direction detecting device 1 so as to move the process to a process at the next third point when the judged result is the reflecting medium Li. The process at the second point is not contained in the first embodiment, and is in detail as follows.

The predetermined reflecting device 62 is arranged at the known position P0 near the traveling course A in such a manner as to direct the reflecting surface within the course A. On the contrary, the own vehicle B is a moving point traveling on the course A. Accordingly, it is necessary that the judging device 65 at first judges whether the laser light Li incoming to the incoming device 52 is the reflecting medium Li from the obstacle D or the reflecting medium Li from the predetermined reflecting device 62. In order to perform the judgement, the known position P0 of the predetermined reflecting device 62, and the position Pi and the direction Pd of the own vehicle B on the course A are employed. That is, the judging device 65 can specify the position Pi and the direction Pd of the own vehicle B so that the known position P0 of the predetermined reflecting device 62 coincides with an extension line of the own vehicle B at a certain position Pi in a certain direction (accurately a direction of the outgoing device 51 and the incoming device 52) since the position Pi and the direction Pd of the own vehicle B on the course A and the known position P0 of the predetermined reflecting device 62 are known. As a result, when the judging device 65 specifies the position Pi of the own vehicle B, it is possible to determine that the medium Li incoming to the incoming device 52 at that time is of course the reflecting medium Li from the predetermined reflecting device 62. The second point performs this kind of judgement.

The third point corresponds to a process of comparing at least one of the laser light Li from the predetermined reflecting device 62 (the laser light Li from the incoming device 52) after completing the judgement at the second point and the distance E calculated by the calculating device 53 with the standards L1 to L2 and/or E1 to E2 previously stored in correspondence to the at least one, and judging whether or not an abnormality exists in at least one of the obstacle detecting apparatus 5 and the predetermined reflecting device 62 on the basis of the comparison. This can be processed in accordance with the monitoring program already explained in the first embodiment. In "the standards L1 to L2 and/or E1 to E2" explained in the third point, "the standards L1 to L2" correspond to the monitoring program in FIG. 3 in the same manner as explained in the first point, and "the standards L1 to L2 and E1 to E2" correspond to the monitoring program in FIG. 4. Then, the monitoring program corresponding to "the standards E1 to E2" (the monitoring program only about the distance E) is not illustrated as mentioned above. Then, in the same manner as that of the first embodiment, the judging device 65 inputs the result of the third point to the controlling device 4.

In this case, it is desirable that the predetermined reflecting device 62 in the tenth embodiment is provided near the low speed traveling point of the own vehicle B and the vehicle stop point such as the outer side of the curve, the near portion of the fuel supply station for the engine, the near portion of the replacing point for the operator and the like. In accordance with this structure, it is possible to reduce a monitoring error. Further, when the outgoing device 51 and the incoming device 52 are integrally supported on the rotating device 61 in a freely rotatable manner, "the direction Pd of the own vehicle B on the course A" can be replaced by "the rotating angle θ of the rotating device 61". In accordance with this structure, since the outgoing device 51 and the incoming device 52 rotate, the incoming device 52 can judge the reflecting medium Li from the predetermined reflecting device 62 at an early time, so that a response for a monitoring can be fastened. It is also possible to judge whether good or bad the rotating device 61 is.

Figure 7A:
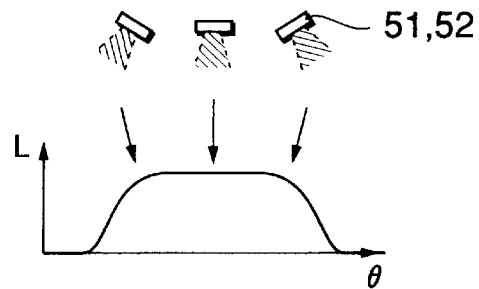
FIG. 7A is a view which shows a pattern of a standard pattern at a normal time.
Figure 7B:
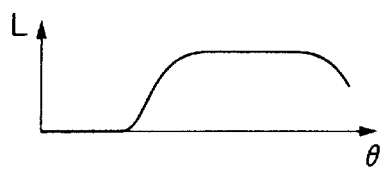
FIGS. 7B and 7C are views which respectively show patterns at an abnormal time.
Figure 7C:
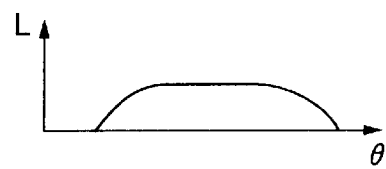

An eleventh embodiment is as follows. In the first embodiment, as the standard, the standard strength range L1 to L2 is employed in the flow chart in FIG. 3 and the standard strength range L1 to L2 and the standard distance range E1 to E2 are employed in the flow chart in FIG. 4, however, it is possible to set the standard shown in FIGS. 7A to 7C. That is, when plotting a change of a strength L (a vertical axis) of the laser light Li at every rotating angles θ (a horizontal axis) while rotating the rotating device 61, a trend and characteristic pattern is generated in correspondence to each of states of the obstacle detecting apparatus 5 (the outgoing device 51 and the incoming device 52), the rotating device 61, the predetermined reflecting device 62 and the rotating angle detecting device 63. FIG. 7A shows a pattern at a normal time, FIG. 7B shows a pattern when the rotating mechanism such as the rotating device 61, the rotating angle detecting device 63a and the like are abnormal and FIG. 7C shows a pattern at an abnormal time when the mud, the snow and the like are attached to the outgoing device 51 and the incoming device 52 of the obstacle detecting apparatus 5 and the opposing surface of the predetermined reflecting device 62. That is, the memory device 66 previously stores various kinds of characteristic patterns at each of the obstacle detecting apparatus 5 (the outgoing device 51 and the incoming device 52), the rotating device 61, the predetermined reflecting device 62 and the rotating angle detecting device 63 as the standards, whereby the judging device 65 can specify an abnormal portion by comparing the pattern obtained by the strength L of the incoming medium Li at every rotating angle θ with the standard patterns. In this case, the standard pattern may be previously given in accordance with the kind of the obstacle detecting apparatus 5, however, under monitoring by the operator, after checking that no abnormality exists in the sensor, the change of the rotating angle θ and the strength L may be plotted and it may be set as the standard. In this case, it is possible to strictly define a good state of the obstacle detecting apparatus 5 at each of the obstacle detecting apparatuses 5, so that more accurate judgement of an abnormality can be performed.

Figure 8A:
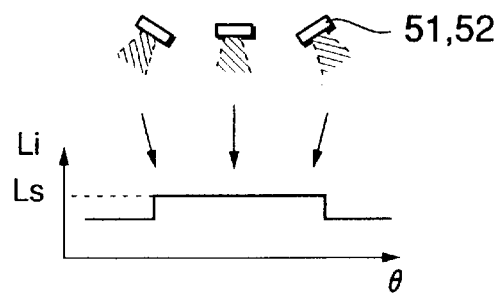
FIG. 8A is a view which shows a pattern of a standard pattern on the basis of another index at a normal time.
Figure 8B:
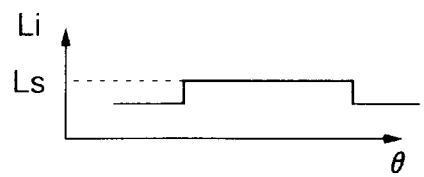
FIGS. 8B and 8C are views which respectively show patterns at an abnormal time.
Figure 8C:
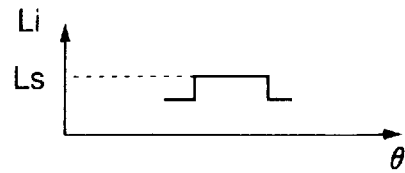

A twelfth embodiment is as follows. Also in the case of setting a simple threshold Ls to the incoming medium Li (vertical axis) at every rotating angles θ (a horizontal axis) while rotating the rotating device 61 so as to make rectangle, a trend and characteristic pattern is generated in correspondence to each of states of the obstacle detecting apparatus 5 (the outgoing device 51 and the incoming device 52), the rotating device 61, the predetermined reflecting device 62 and the rotating angle detecting device 63. FIGS. 8A to 8C show a range of the rotating angle θ being made rectangle when the judging device 65 obtains the incoming medium Li which can be used for defining the obstacle D (the threshold is Ls at this time). FIG. 8A shows a pattern at a normal time, FIG. 8B shows a pattern when the rotating mechanism such as the rotating device 61, the rotating angle detecting device 63a and the like are abnormal and FIG. 8C shows a pattern at an abnormal time when the mud, the snow and the like are attached to the outgoing device 51 and the incoming device 52 of the obstacle detecting apparatus 5 and the opposing surface of the predetermined reflecting device 62.

A thirteenth embodiment is as follows. In the first embodiment, it is best that the predetermined reflecting device 62 uses an exclusive so-called reflector, however, various kinds can be prepared in correspondence to a kind and a strength of the outgoing medium Lo, a setting level of a standard (a threshold) with respect to the incoming medium Li, a calculating accuracy and a calculating speed of the calculating device 53 in the obstacle detecting apparatus 5, a reflecting angle, a shape, a reflecting surface condition and a material of the predetermined reflecting device 62 and the like. In the case of the best condition, a simple iron plate, a reinforcing member of the own vehicle B and the like may be sufficient. That is, if the predetermined reflecting device 62 has the same structure as that of the first embodiment except that an outer appearance is different from the predetermined reflecting device 62, that is, a reflecting body such as the reflecting device is provided in front thereof, the first embodiment is completed. Accordingly, the predetermined reflecting device 62 is inexpensive and the existing structure can be diverted.

A fourteenth embodiment is as follows. In the first embodiment, the calculating device 53, the judging device 65 and the controlling device 4 are independently shown for the purpose of easily understanding the explanation, however, it is possible to process the calculating device 53 and the judging device 65 within one controlling device 4.

The first to fourteenth embodiments mentioned above correspond to the monitoring mechanism applied to the transmitting and receiving type obstacle detecting apparatus for the vehicle. However, contents of each of the fifth embodiment inherent to the transmitting and receiving type for the vehicle and the first to fourth, the sixth and the eighth to fourteenth embodiments except the seventh embodiment which can not obtain a significant effect as the receiving type can be applied as the monitoring mechanism with respect to the receiving type obstacle detecting apparatus for the vehicle.

In particular, it is obtained by deleting "the outgoing device 51" from a group of elements in each of the structure in accordance with the first to fourth, the sixth and the eighth to fourteenth embodiments and replacing "the predetermined reflecting device 62" by "a predetermined object 62. Of course, a basic effect between the corresponding structures is the same (in this case, although the basic effect is the same, an operation for achieving the effect is of course different since the elements are deleted and replaced). However, the "difference of the operation" is obvious from the difference of the elements. Accordingly, hereinafter, a description will be given of fifteenth to twentieth embodiments which is preferable as the monitoring mechanism of the receiving type obstacle detecting apparatus for the vehicle in correspondence to the first to fourth, the sixth and the eighth to fourteenth embodiments. In this case, the incoming device 52 is replaced by an image pickup device 52. Accordingly, the incoming medium Li is replaced by an incoming light Li, and the information thereof corresponds to the obstacle D and an image information of the predetermined object 62 in detail mentioned below (a contrast, a color and a position on the image of the incoming light Li, or a strength of a light in each of image pickup components constituting the image pickup device 52). Further, there is a structure which can detect the distance E to the obstacle D and the predetermined object 62 by one image pickup device 52, however, since it is expensive at present, two image pickup devices 52 and 52 are arranged on the bumper apart from each other in such a manner as to direct to a forward portion of the vehicle, and an image picked up object (the obstacle D or the predetermined object 62) having the same shape (and the same color) is extracted among the picked up images in each of the image pickup devices 52 and 52, thereby calculating from an angle of the incoming light Li forming each of the picked up objects (the angle is generated as a difference of a position on the image).

A fifteenth embodiment is mainly structured by including the object (the effect) of the first to fourth, the eighth and the tenth to fourteenth embodiments. That is, in accordance with the fifteenth embodiment, in an obstacle detecting apparatus 5 for a vehicle having an image pickup device 52 which image pickups an obstacle D existing in a traveling direction of a vehicle B and a calculating device 53 receiving an image pickup information Li from the image pickup device 52, calculating a distance E from the vehicle B to the obstacle D and determining an existence of the obstacle D on the basis of the distance E, and mounted to the vehicle B, the obstacle detecting apparatus 5 has a following monitoring mechanism 6. The monitoring mechanism 6 is structured such as to have a rotating device 61 rotatably supporting the image pickup device 52, a predetermined object 62 arranged in such a manner as to be capable of inputting the image pickup information Li to the image pickup device 52 when the rotating device 61 rotates and the rotating angle θ becomes a predetermined angle range θ1 to θ2, a rotating angle detecting device 63 detecting the rotating angle θ of the rotating device 61, and a judging device 65 connected to at least one of the image pickup device 52 and the calculating device 53 and the rotating angle detecting device 63, comparing at least one of the image pickup information Li from the image pickup device 52 and the distance E calculated by the calculating device 53 with standards L1 to L2 and/or E1 to E2 previously stored in correspondence to the at least one when the rotating angle θ from the rotating angle detecting device 63 is a predetermined angle range θ1 to θ2 and judging whether or not an abnormality exists with respect to at least one of the obstacle detecting apparatus 5, the rotating device 61, the predetermined object 62 and the rotating angle detecting device 63 on the basis of the comparison. Further, in this case, it is possible to judge an abnormality with respect to a light environment by a sun and a light apparatus.

A sixteenth embodiment is structured such as to correspond to the object (the effect) contained in the first embodiment. That is, in accordance with the sixteenth embodiment, in the fifteenth embodiment mentioned above, the monitoring mechanism 6 is connected to a vehicle stop detecting device 64 which detects a stop time of the vehicle B so as to input a vehicle stop signal St to the judging device 65. Then, the rotating device 61 receives drive signals θa and θb from the judging device 65 so as to be freely rotatable, and the judging device 65 is connected to the vehicle stop detecting device 64 and gives the drive signal θb to the rotating device 61 when receiving the vehicle stop signal St from the vehicle stop detecting device 64 so as to rotate the rotating device 61 at a predetermined angle range θ1 to θ2.

A seventeenth embodiment is structured such as to correspond to the object (the effect) contained in the sixth embodiment. That is, in accordance with the seventeenth embodiment, in the fifteenth or sixteenth embodiment mentioned above, the rotating device 61 is structured such as to rotate the rotating angle θ at a predetermined angle range θ1 to θ2 at a predetermined time t.

An eighteenth embodiment is structured such as to correspond to the object (the effect) contained in the ninth embodiment. That is, in the fifteenth, sixteenth and seventeenth embodiments mentioned above, there is provided a plurality of rotating devices 61 supporting the image pickup device 52 in a freely rotatable manner, and the respective rotating devices 61 and 61 are arranged so that one of the rotating devices 61 corresponds to the predetermined object 62 for the image pickup device 52 of the other rotating device 61 between at least two rotating devices 61 and 61 when simultaneously rotating the rotating devices 61 at a predetermined angle range θ1 to θ2.

A nineteenth embodiment is structured such as to correspond to the object (the effect) contained in the tenth embodiment. That is, there is provided an obstacle detecting apparatus 5 for a vehicle having an image pickup device 52 which image pickups an obstacle D existing in a traveling direction of a vehicle B and a calculating device 53 receiving an image pickup information Li from the image pickup device 52, calculating a distance E from the vehicle B to the obstacle D and determining an existence of the obstacle D on the basis of the distance E, and mounted to the vehicle B, wherein the obstacle detecting device is provided with a monitoring mechanism 6 comprising:
(a) a predetermined object device 62 arranged at a known position P0 near a traveling course A;
(b) provided in the vehicle B;
(b1) a storing device 66 for storing the known position P0 of the predetermined object device 62;
(b2) an own vehicle position and direction detecting device 1 for detecting a position Pi and a direction Pd of an own vehicle B in the course A; and
(b3) a judging device 65 connected to at least one of the storing device 66, the own vehicle position and direction detecting device 1, the image pickup device 52 and the calculating device 53, judging whether or not an image pickup information Li to the image pickup device 52 is an image pickup information Li from the predetermined object 62 on the basis of the known position P0 of the predetermined object 62 read out from the storing device 66 and the position Pi an the direction Pd of the own vehicle B in the course A from the own vehicle position and direction detecting device 1, comparing at least one of the image pickup information Li from the image pickup device 52 and the distance E calculated by the calculating device 53 with standards L1 to L2 and/or E1 to E2 previously stored in correspondence to the at least one when judging that it is the image pickup information Li, and judging whether or not an abnormality exists in at least one of the obstacle detecting apparatus 5 and the predetermined object 62 on the basis of the comparison, and mounted to the vehicle B.

A twentieth embodiment is structured such as to correspond to the object (the effect) contained in the first embodiment. That is, in the eighteenth embodiment mentioned above, the image pickup device 52 is supported on the rotating device 61 in a freely rotatable manner.

In this case, in each of the embodiments mentioned above, the rotating device 61 rotatably supports the outgoing device 51 and the incoming device 52 or the image pickup device 52 (this is called tentatively as an A structure). Further, it is possible to perform a normal obstacle detection and monitoring by fixing the outgoing device 51 and the incoming device 52 or the image pickup device 52 to the vehicle body, supporting the outgoing medium path and the incoming medium path or supporting the reflecting body in the incoming medium path by the rotating device 61 in such a manner as to freely control a rotation, and rotating a reflecting mirror by the rotating device 61 (this is called tentatively as a B structure). However, in view of intending to freely change the medium path by the rotating device 61, the A and B structures are the same at all.

Accordingly, "SUMMARY OF THE INVENTION" mentioned above corresponds to a description of the A structure on terms, that is, the rotating device 61 integrally supporting the outgoing device 51 and the incoming device 52 in a freely rotatable manner (the first to fifth and seventh aspects), and the rotating device 61 rotatably supporting the image pickup device 52 (the eighth to eleventh and thirteenth aspects), however, the first to fifth and seventh aspects include "the rotating device 61 fixing the outgoing device 51 and the incoming device 52 to the vehicle body and rotatably supporting the reflecting body in the outgoing medium path and the incoming medium path", and on the contrary, the eighth to eleventh and thirteenth aspects include "the rotating device 61 fixing the image pickup device 52 to the vehicle body and rotatably supporting the reflecting body in the incoming medium path".

What is claimed is:

1. A monitoring apparatus for an obstacle detecting device mounted on a vehicle, said obstacle detecting device having a transmitter for transmitting a signal in a direction of traveling of said vehicle, a receiver for receiving a signal reflected by an obstacle, a calculating device for calculating, based on said transmitted signal and said received signal, a distance to an obstacle, said monitoring apparatus comprising:

a rotating device which supports said transmitter and receiver in a rotatable manner;

a rotating angle detecting device for detecting a rotation angle of said rotating device;

a reflecting device for reflecting the transmitted signal from the transmitter toward the receiver when said rotating device is rotated to a predetermined angle range; and a judging device connected to at least one of said receiver, said calculating device, and said rotating angle detecting device for comparing a previously stored standard with at least one of said received signal and said distance to an object, and for judging based on said comparison, whether an abnormality exists in at least one of the obstacle detecting apparatus, the rotating device, the reflecting device and the rotating angle detecting device.

2. A monitoring apparatus in accordance with claim 1, further comprising a vehicle stop detecting device which detects a stop time of the vehicle and which, in response, outputs a vehicle stop signal to the judging device, wherein said judging device, in response to said vehicle stop signal, outputs a drive signal to said rotating device to rotate to said predetermined angle range.

3. A monitoring apparatus in accordance with claim 1, wherein said rotating device rotates to said predetermined angle range at a predetermined time.

4. A monitoring apparatus in accordance with claim 1, further comprising a plurality of reflecting devices for reflecting the transmitted signal from the transmitter toward the receiver.

5. A monitoring apparatus in accordance with claim 1, further comprising a plurality of rotating devices and a plurality of reflecting devices, each rotating device supporting a transmitter, a receiver and a reflecting device, wherein, when said rotating devices are rotated to a predetermined angle range, the reflecting device mounted on one of said rotating devices reflects a transmitted signal from a transmitter on another one of said rotating devices toward the receiver on said another one of said rotating devices.

6. A monitoring apparatus for an obstacle detecting device mounted on a vehicle, said obstacle detecting device having a transmitter for transmitting a signal in a direction of traveling of said vehicle, a receiver for receiving a signal reflected by an obstacle, a calculating device for calculating, based on said transmitted signal and said received signal a distance to an obstacle, said monitoring apparatus comprising:

a reflecting device for placement at a known position adjacent to a traveling course;

a storing device for storing said known position of said reflecting device;

a vehicle position and direction detecting device for detecting a position and direction of said vehicle in said traveling course; and a judging device connected to at least one of said storing device, said vehicle position and direction detecting device, said receiver, and said calculating device for judging whether a signal received by said receiver is a reflected signal from said reflecting device based on said known position of the reflecting device and a current position and direction of the vehicle output from said vehicle position and direction device, and, in the case where said signal received by said receiver is judged to be a reflected signal from said reflecting device, said judging device comparing a previously stored standard with at least one of said received signal and said distance calculated by the calculating device and determining, based on the comparison, whether an abnormality exists in at least one of said obstacle detecting device and said reflecting device.

7. A monitoring apparatus for an obstacle detecting device in accordance with claim 6, further comprising a rotating device, wherein said transmitter and receiver are supported on said rotating device so as to be rotatable therewith.

8. A monitoring apparatus for a obstacle detecting device mounted on a vehicle, said obstacle detecting device having an image pickup device for picking up an image of an obstacle existing in a traveling direction of said vehicle, a calculating device for calculating a distance to said obstacle, said monitoring apparatus comprising:

a rotating device which supports said image pickup device in a rotatable manner;

a rotating angle detecting device for detecting a rotation angle of said rotating device;

a predetermined object positioned so as to input predetermined image information to the image pickup device when the rotating device is rotated to a predetermined angle range; and a judging device, connected to at least one of said image pickup device, said calculating device, and said rotating angle detecting device, for comparing a previously stored standard with at least one of said information from said image pickup device and said distance to an obstacle, and for judging based on said comparison, whether an abnormality exists in at least one of the obstacle detecting device, the rotating device, the predetermined object and the rotating angle detecting device.

9. A monitoring apparatus for an obstacle detecting device in accordance with claim 8, further comprising:

a vehicle stop detecting device which detects a stop time of the vehicle and which, in response, outputs a vehicle stop signal to the judging device, wherein said judging device, in response to said vehicle stop signal, outputs a drive signal to said rotating device to rotate to said predetermined angle range.

10. A monitoring apparatus for an obstacle detecting device in accordance with claim 8, wherein said rotating device rotates to said predetermined angle range at a predetermined time.

11. A monitoring apparatus for an obstacle detecting device in accordance with claim 8, further comprising a plurality of rotating devices, each rotating device supporting an image pickup device, wherein, when said rotating devices are rotated to a predetermined angle range, one of said rotating devices corresponds to said predetermined object for an image pickup device on another one of said rotating devices.

12. A monitoring apparatus for an obstacle detecting device mounted on a vehicle, said obstacle detecting device having an image pickup device for picking up an image of an obstacle existing in a traveling direction of said vehicle, and a calculating device for calculating a distance to said obstacle, said monitoring apparatus comprising:

a predetermined object for placement at a known position adjacent to a traveling course;

a storing device for storing said known position of said predetermined object;

a vehicle position and direction detecting device for detecting a position and direction of said vehicle in said traveling course;

a judging device, connected to at least one of said storing device, said vehicle position and direction detecting device, said image pickup device and said calculating device, for judging whether information from said image pickup device is information corresponding to said predetermined object based on said known position of the reflecting device and a current position and direction of the vehicle output from said vehicle position and direction device, and, in the case where said information from said image pickup device is judged to be information corresponding to said predetermined object, said judging device comparing a previously stored standard with at least one of said information from said image pickup device and said distance calculated by the calculating device and determining, based on the comparison, whether an abnormality exists in at least one of said obstacle detecting device and said predetermined object.

13. A monitoring apparatus for an obstacle detecting device in accordance with claim 12, further comprising a rotating device and wherein said image pickup device is supported on said rotating device so as to be rotatable therewith.

* * * * *